United States Patent
Kammeraad et al.

(10) Patent No.: US 6,207,957 B1
(45) Date of Patent: Mar. 27, 2001

(54) SYSTEM TO QUANTIFY GAMMA-RAY RADIAL ENERGY DEPOSITION IN SEMICONDUCTOR DETECTORS

(75) Inventors: Judith E. Kammeraad, San Ramon, CA (US); Jerome J. Blair, Las Vegas, NV (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/156,987

(22) Filed: Sep. 18, 1998

(51) Int. Cl.$^7$ .................................................. G01T 1/24
(52) U.S. Cl. ................. 250/370.1; 250/370.09; 250/366
(58) Field of Search .................... 250/370.1, 370.09, 250/366

(56) References Cited

U.S. PATENT DOCUMENTS

| | | | |
|---|---|---|---|
| 3,934,143 | * | 1/1976 | Prag ................................. 250/370.1 |
| 4,727,256 | * | 2/1988 | Kumazawa ........................ 250/370.1 |
| 5,282,023 | * | 1/1994 | Scarpa .................................. 358/36 |
| 5,315,506 | * | 5/1994 | Wang et al. .................... 364/413.19 |
| 5,825,033 | * | 10/1998 | Barrett et al. ..................... 250/370.1 |
| 5,866,907 | * | 2/1999 | Drukier et al. ...................... 250/366 |

OTHER PUBLICATIONS

Glenn F. Knoll, "Radiation Detection and Measurement," 2nd edition, John Wiley & Sons (1989) pp. 401–407.

I. Peter, Th. Kroll, Th. Elze, J. Gerl, T. Happ, M. Kaspar, H. Schaffner, S. Schremmer, R. Schubert, and K. Vetter, "Analysis of Measured and Simulted Ge–Detector Pulse Shapes," GSI Scientific Report 1994, ISSN 0174–0814, Mar. 1995, p. 272.

A. Del Zoppo, C. Agodi, R. Alba, G. Bellia, R. Coniglione, K. Loukachine, C. Maiolino, E. Migneco, P. Piatelli, D. Santonocito and P. Sapienza, "Rejecting Escape Events in Large Volume Ge Detectors by a Pulse Shape Selection Procedure," Nuclear Instruments and Methods in Physics Research A334 (1993) pp. 450–456.

B. Aspacher and A. C. Rester, "Compton Continuum Suppression by Analog Pulse Shape Analysis," Nuclear Instruments and Methods in Physics Research A338 (1994) pp. 511–515.

B. Aspacher and A. C. Rester, "Compton Continuum Suppression by Analog Pulse Shape Analysis Part II," Nuclear Instruments and Methods in Physics Research A338 (1994) 516–21.

Th. Kröll, I. Peter, Th. Elze, J. Gerl, Th. Happ, M. Kaspar, H. Schaffner, S. Schremmer, R. Schubert, K. Vetter, and H.J. Wollersheim, "Analysis of Simulated and Measured Pulse Shapes of Closed–Ended HPGe Detectors," Nuclear Instruments and Methods in Physics Research A371 (1996) pp. 489–496.

* cited by examiner

*Primary Examiner*—Constantine Hannaher
*Assistant Examiner*—Otilia Gabor
(74) *Attorney, Agent, or Firm*—James M. Skorich; Alan H. Thompson (57) ABSTRACT

A system for measuring gamma-ray radial energy deposition is provided for use in conjunction with a semiconductor detector. The detector comprises two electrodes and a detector material, and defines a plurality of zones within the detecting material in parallel with the two electrodes. The detector produces a charge signal E(t) when a gamma-ray interacts with the detector. Digitizing means are provided for converting the charge signal E(t) into a digitized signal. A computational means receives the digitized signal and calculates in which of the plurality of zones the gamma-ray deposited energy when interacting with the detector. The computational means produces an output indicating the amount of energy deposited by the gamma-ray in each of the plurality of zones.

13 Claims, 4 Drawing Sheets

SYSTEM TO QUANTIFY GAMMA-RAY RADIAL ENERGY DEPOSITION IN SEMICONDUCTOR DETECTORS

STATEMENT OF GOVERNMENT INTEREST

The United States Government has rights in this invention pursuant to Contract No. W-7405-ENG-48 between the United States Department of Energy and the University of California.

FIELD OF THE INVENTION

This invention relates to apparatus and methods for detecting gamma-ray interactions with semiconductor detectors.

BACKGROUND OF THE INVENTION

A gamma-ray interacting with a detector loses energy to the detector with each interaction, such that a charge builds up in the detector which is proportional to the energy lost by the gamma-ray. Such detectors are commonly used to measure the total energy deposited by incident gamma-rays. To accomplish this purpose, a simple system measuring the amount of charge produced in the detector can be utilized in conjunction with the detector.

However, some physics experiments and detector technologies require more detailed information about gamma-ray interactions with the detector than these simple systems can provide. For example, where the energy deposited by individual gamma-rays is to be measured, experimenters need further data to account for effects such as Doppler shifts and Compton scattering.

Doppler shifts result from the well-known Doppler effect where the change in measured frequency of a wave at a given measuring point is dependent upon the motion of the source of the wave relative to the measuring point. The degree to which one can correct gamma-ray measurements in a detector for Doppler shifts depends upon the accuracy of the measurement of the position at which the gamma-ray first interacted with the detector.

Historically, the efforts made to improve position certainty centered upon reducing the size of individual detector elements composing a detector array. The level of position certainty was limited to the physical size of each individual detector element in the array.

A need for greater position certainty has led to the concept of segmented semiconductor detectors. In a segmented detector, the detector is divided into a number of segments one or both of the electrodes is physically divided into a number of segments (thereby providing in actuallity a plurality of separate electrodes). A separate signal is measured from each segment. The segment closest to the location where a gamma-ray interacts will display a signal with a non-zero integral. Adjacent segments will display induced signals with an amplitude that increases with the nearness of the interaction to the electrode; these signals have a zero integral. The signals from all of the segments must be analyzed together in order to determine the coordinates of the location or locations where the gamma-ray interacted. The induced signals provide the coordinates perpendicular to the detector's electric field. The coordinate parallel to the electric field, herein called the radial coordinate, can only be obtained by performing a detailed pulse shape analysis of the signal that has a non-zero integral.

Prior efforts in this field have obtained only rough determinations of the radial coordinate. The best prior efforts [Th. Kroll, I. Peter, Th. W. Elze et al., Nuclear Instruments and Methods in Physics Research A371, 489 (1996)] have obtained radial positions to an uncertainty of 4 mm to 8 mm. However, the accuracy is limited by using a simple measure of the average rise time of the signal, regardless of the fact that the signal may correspond to multiple gamma-ray interactions, each with its own radial location and corresponding rise time. In contrast the method of the present invention utilizes the entire signal in order to obtain the radial location of each interaction with an uncertainty of 1.0 mm and less (depending upon deposited energy), even for multiple gamma-ray interactions.

When all three coordinates of the gamma-ray interactions are measured with sufficient accuracy such as in the present invention, new detector technologies become possible. For example, one can utilize a segmented semiconductor detector and the full signal processing techniques to obtain an image of an object that emits gamma-rays. This is an extension of the concept of Compton imaging, which is well known in the scientific literature. Using a large segmented germanium detector, one can obtain such images with high efficiency, with excellent energy resolution, without a detector array, without collimation, and without tomographic techniques. The existing art has trade-offs in all of these areas. There is no known existing art that encompasses all of these properties.

Another new detector technology provided by the present invention is the ability to perform Compton suppression in gamma-ray spectroscopy without the use of anti-coincidence detectors. For gamma-rays in the energy range of roughly 0.15 MeV to 8 MeV the Compton interaction is the dominant mode by which a gamma-ray interacts with germanium. In a Compton interaction the incident gamma-ray interacts with an atomic electron. The electron receives some of the gamma-ray's energy, and the remainder is conserved in a scattered gamma-ray with less energy than the original gamma-ray. If the scattered gamma-ray escapes from the detector, the event is called a "Compton escape event".

An escape event can skew the measurement of the spectrum of gamma-rays incident upon a detector because the energy deposited in the detector represents only a part of the energy of the original gamma-ray. If not identified and accounted for, escape events not only provide inaccurate information about the energy carried by the original scattered gamma-ray, but may confuse measurements for other gamma-ray interactions with the detector. For example, measurement of a low energy gamma-ray line may be distorted by the presence of a large Compton-escape continuum from a higher energy gamma-ray unless the Compton escape events produced by the higher energy gamma-ray are suppressed from the measurement.

The traditional method of performing Compton suppression has required experimenters to surround the detector with anti-coincidence detectors. These detectors add cost, volume, and mass to detector measurement systems. While some work has been done to perform Compton suppression without the use of anti-coinicidence detectors, all such work has analyzed the signals produced by the detector for the average rise time of the signal.

SUMMARY OF THE INVENTION

It is therefore an object of the present invention to provide an improved apparatus for detecting gamma-ray interactions with a semiconductor detector.

Another object of the present invention is to provide improved position certainty in detecting gamma-ray interactions with a detector.

Another object of the present invention is to obtain the radial location of gamma-ray interactons with a detector even for multiple interactions.

A further object of the present invention is to unfold a gamma-ray interaction with a detector into its various interaction components to obtain the radial coordinate precisely for each interaction. A still further object of the present invention is to accurately determine all three spatial coordinates of a gamma-ray interaction with a detector.

Another object of the present invention is to unfold the spatial distribution of the individual energy depositions with each gamma-ray shower in order to detect escape events.

Another object of the present invention is to detect Compton escape events in gamma-ray interaction with a detector.

Still another object of the present invention is to suppress Compton escape events from the measurement of gamma-ray interactions.

Yet another object of the present invention is to utilize a segmented detector and signal processing techniques to obtain an image of an object that emils gamma rays.

These and other objects are provided by the system for measuring gamma-ray radial energy deposition of the present invention in conjunction with a segmented semiconductor gamma-ray detector in which the electrodes define a plurality of zones within the detector material. For example, in a cylindrical detector, multiple zones may be defined in the detector material between a longitudinal axial electrode and a plurality of electrodes positioned on the circumference of the detector. The detector produces a charge signal E(t) when a gamma ray interacts with the detector. The shape of the charge signal E(t) depends on the location at which the gamma ray deposited energy in the detector, the electric field of the detector and the amount of charge produced in the detector. The charge signal E(t) is first digitized and then processed in a computational means which calculates in which of the plurality of zones within the detector the gamma ray deposited energy when interacting with the detector. The computational means produces an output indicating the amount of energy deposited by the gamma ray in each of the plurality of zones.

Other objects, advantages and features of the present invention will be apparent from the following description of the preferred embodiment when considered in conjunction with the accompanying drawings wherein like reference characters represent like or similar parts in the several views.

DESCRIPTION OF THE PREFERRED EMBODIMENT

Figure 1:
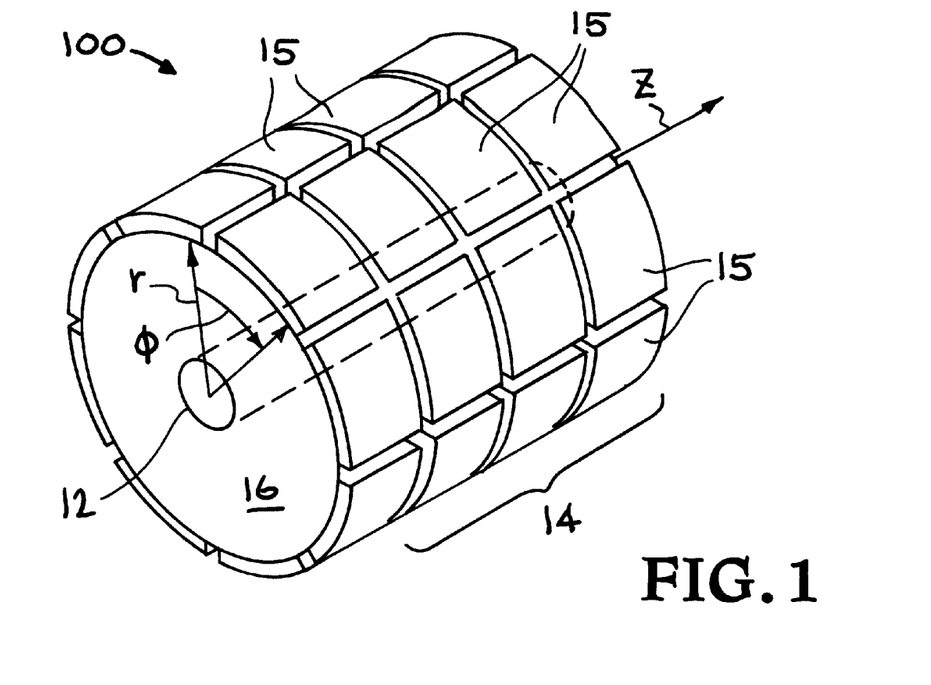
FIG. 1 is a perspective view of a segmented cylindrical detector.

Referring to FIG. 1, a segmented cylindrical detector 100 is shown. Cylindrical detector 100 comprises an axial inner electrode 12, a thin cylindrical outer electrode structure 14 having a plurality of electrically isolated electrode segments 15, and a detecting material 16, such as germanium, situated between the inner electrode and the outer electrode segments. For convenience, the outer electrode structure 14 is sometimes referred to herein as if it is a single monolithic electrode (i.e, a non-segmented detector), even though it preferably comprises a plurality of electrically isolated electrode segments 15. Any point within detector 100 can be identified by three coordinates: radial coordinate r, axial coordinate z, and angle coordinate φ. While FIG. 1 illustrates a "pure coaxial" detector geometry in which the inner electrode 12 extends the entire length of the detector 100, most commercially available detectors have a "closed end" in which the inner electrode stops short of one end of the detector. Either "pure coaxial" or "closed end" detectors can utilize the inventive system. The preferred embodiment utilizes the pure coaxial geometry, although the inventive system works well with the closed end geometry.

It is known that by dividing one of electrodes 12 and 14, preferably outer electrode 14, into electrically isolated segments such as segments 15, it is possible to determine the z and φ coordinates at which gamma-ray interactions with the detector take place. While the detector 100 is preferably segmented to allow calculation of these first two coordinates, the inventive system may be used with non-segmented detectors. The inventive system is directed at determining the radial coordinate r at which the gamma-ray interactions with the detector take place.

The inventive system may also be used with non-cylindrical detectors. In fact, with any detector for which two coordinates define a position on the surface of one of two electrodes and a third coordinate defines the distance of a point between the two electrodes, the inventive system may be used to determine the third coordinate. For convenience, the term "radial coordinate" ("re") will be used throughout this description to refer to this third coordinate even where, as in the planar detector 20 described below, the distance measured is not strictly a radius.

Figure 2:
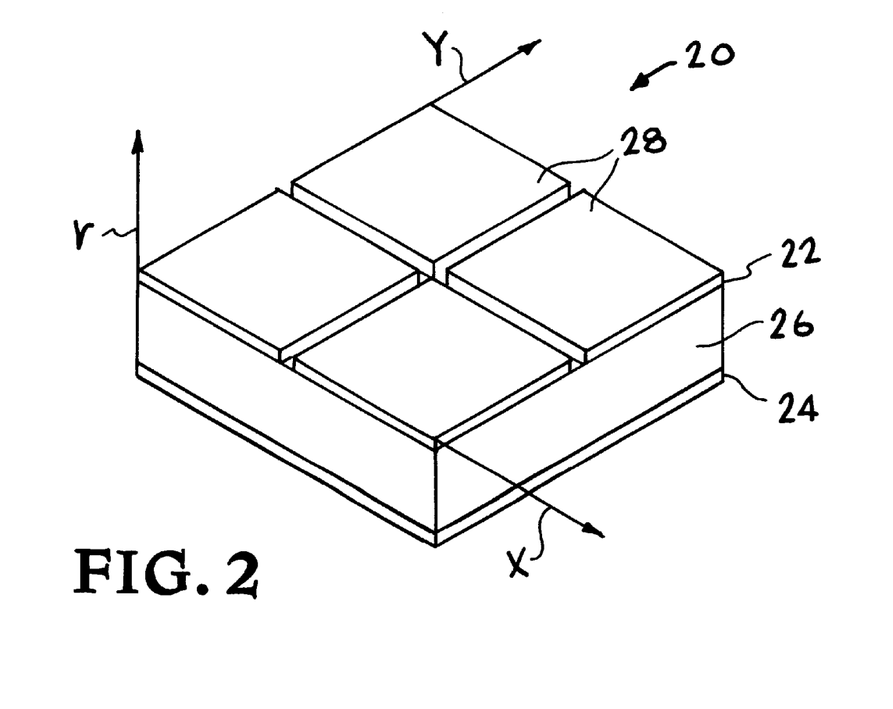
FIG. 2 is a perspective view of a segmented planar detector with a superimposed coordinate system.

As an example of a non-cylindrical detector, FIG. 2 depicts a planar detector 20. Detector 20 is composed of electrodes 22 and 24 sandwiching a semiconductor material 26. In a segmented detector, electrode 22 comprises electrically isolated electrode segments 28, which may be used to determine the x and y coordinates at which gamma-ray interactions with detector 20 take place. For planar detector 20, the present invention determines the coordinates along the "r" axis at which a gamma-ray deposits energy in the detector.

In the invention's experimental form, the semiconductor material was high-purity germanium. However, other semiconductor materials may also be used. For example, a new semiconductor material, cadmium zinc telluride (CdZnTe) is currently undergoing testing and appears to have promise as a detecting material. Germanium must be cooled to liquid nitrogen temperatures for effective operation whereas CdZnTe can be used at room temperature.

Figure 3:
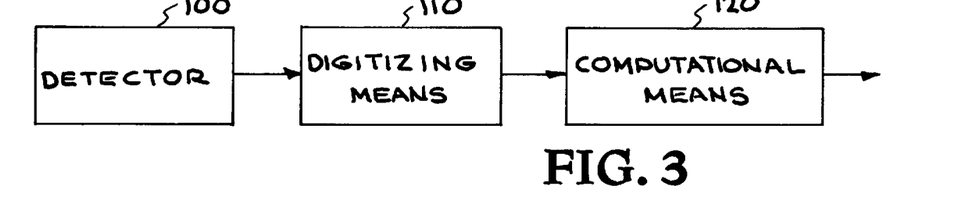
FIG. 3 is a block diagram showing the ordering of the components used in the preferred inventive system to perform radial energy distribution calculations.
Figure 4:
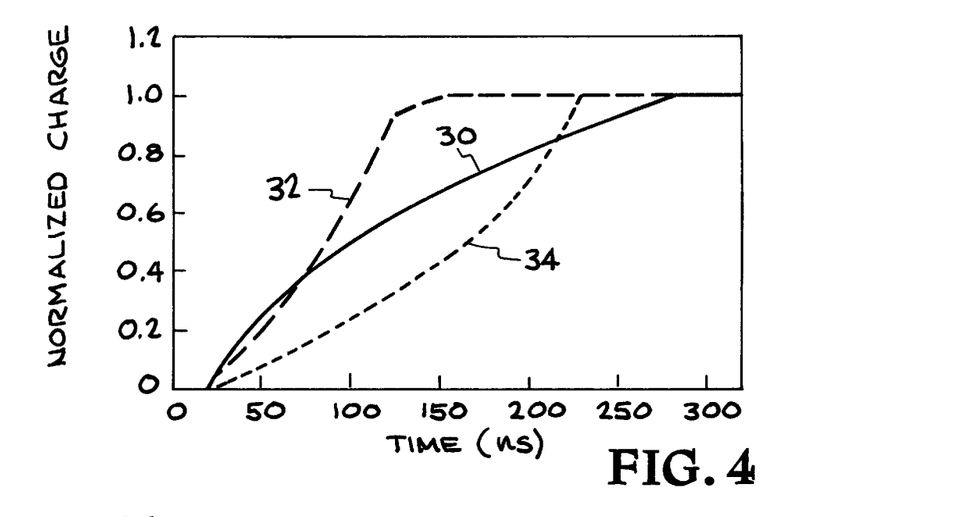
FIG. 4 is a plot showing examples of charge signals obtained from a 5-cm diameter, conventional germanium detector when a gamma-ray interacts at r=5 mm, r=15 mm, or r=25 mm.

Referring to FIG. 3, a conventional semiconductor detector 100 is shown in conjunction with the basic elements of the inventive system. When a gamma-ray interacts with detector 100, the gamma-ray produces a charge in detector 100 at each point of interaction. From the accumulation of these charges, detector 100 outputs a charge signal (from each segment) whose shape depends on the coordinates at which the gamma-ray deposited energy in the detector, the electric field of the detector, and the amount of charge produced in the detector. In particular, the shape of the leading edge of the charge signal output by the detector is dependent upon the radial coordinates at which the gamma-ray deposited energy in the detector. For example, FIG. 4 shows charge signals 30, 32 and 34 indicating a radial coordinate of 5 mm, 15 mm and 25 mm, respectively, produced by a conventional, unsegmented, 5-cm diameter, cylindrical germanium detector. By recording and analyzing the charge signal, using methods described herein, one can determine the radial coordinates of the interactions.

Figure 5:
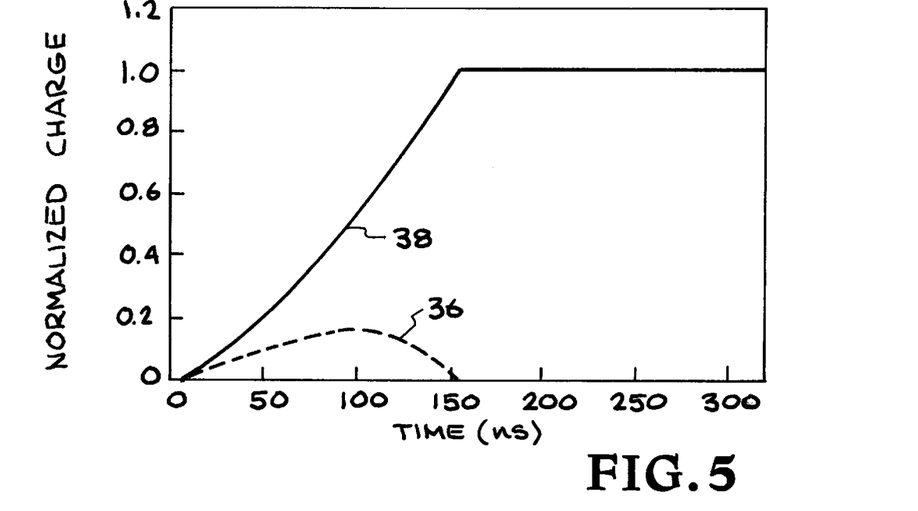
FIG. 5 is a plot showing examples of charge signals obtained from two adjacent segments of a segmented germanium detector when a gamma-ray interacts in one segment.

A conventional unsegmented detector provides no information about the other spatial coordinates of the interactions (i.e., z and φ in a cylindrical geometry). To obtain all three spatial coordinates, one must utilize a segmented detector. For example, FIG. 5 shows the charge signals produced simultaneously in two adjacent segments when a gamma-ray interacts in one segment. Signal 38 represents the signal produced in the segment where the gamma-ray interaction occurred. The adjacent segment produces an induced signal 36 whose amplitude depends upon the distance of the interaction from the segment. The same effect occurs with all neighboring segments regardless of whether they are directly adjacent to the segment with the interaction. However, as the distance from the interaction to a given segment increases, the amplitude of the induced signal decreases. Distant segments will have very small or unmeasureable induced signals. Multiple simultaneous gamma-ray interactions cause each of the segments to produce a signal that is the sum of the signals generated by the individual interactions. By measuring the signals from all of the segments simultaneously and performing a least squares fit, one can determine all three spatial coordinates of the interactions.

Figure 6:
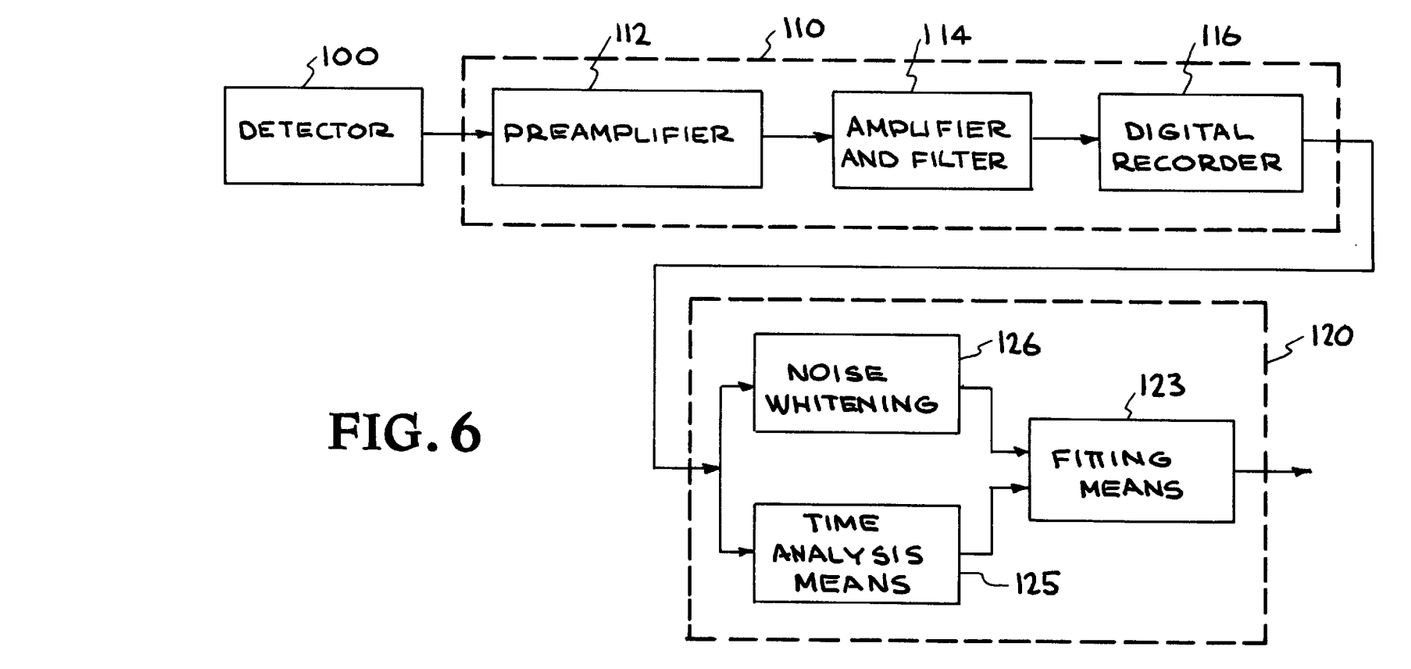
FIG. 6 is a block diagram showing the ordering of the components used in the preferred inventive system of FIG. 3 in which the components of FIG. 3 are broken down into preferred sub components.

In the inventive system, the charge signal output by detector 100 is read by a digitizing means 110 which converts the detector output into a digital signal. The digital signal preserves the details of the impact position of the gamma-ray. The preferred components used to digitize the signal are shown in FIG. 6. The charge signal is first pre-amplified in pre-amplifier 112. Amplifier and filter 114 then shape the signal so that it may most accurately be digitized by digital recorder 116.

The purpose of amplifier and filter 114 is to condition the charge signal to be accurately measured by digital recorder 116. Preferably, the shaping of the pulse by amplifier and filter 114 ensures that the electrical noise already produced by the detector is greater than the noise produced by the digital recorder. The important point is that the noise introduced by the digitization means should not add significantly to the noise already present in the charge signal from the detector. An additional constraint is that the maximum voltage appearing at the input to digital recorder 116 is less than or equal to $V_D$, the full scale voltage of digital recorder 116.

The following conditions describe how to select a digitizing means which does not produce undesirable levels of noise. If the power spectral density of the noise from the detector, as measured at the input to amplifier and filter 114, is designated $S_1(f)$, and the power gain of amplifier and filter 114 is designated $H_2(f)$, then the noise power at the input to digital recorder 116, designated $S_2(f)$, will be the product $S_1(f)H_2(f)$. A well constructed digital recorder produces noise equivalent to white noise at its input, with the power spectral density given by $$S_D(f) = \frac{V_D^2 2^{-2E}}{6 f_s} \tag{1}$$

where E is the number of effective hits of digital recorder 116 and is is the sampling frequency of digital recorder 116 [IEEE Standard 1057–1994, p. 38]. The requirement that the digitizing means not add significantly to the noise is that $S_2(f)$ be significantly greater than $S_D(f)$, such as by a factor of three, over as wide as possible a band of frequencies.

In a well-designed gamma-ray detector, the dominant source of noise will be white noise at the detector output. In that case, $S_1(f)$ will he proportional to the power gain of preamplifier 112, which is typically that of a low pass filter. Accordingly, amplifier and filter 114 should be a filter which accentuates high frequencies, in order to bring the detector noise above the noise of the digitizing means. Examining the formula given for $S_D(f)$, the important characteristic of the digitizing means is that the quantity $2^{-2E}/f_s$ should be made as small as possible. The value of $V_D$ is not as important, because the gain of the amplifier can be adjusted to optimize the system for any value.

Referring back to FIG. 3, the output of digitizing means 110 is preferably fed into an inventive computational means 120, which calculates the radial energy distribution. FIG. 6 shows the preferred embodiment of the computational means comprising noise whitening filter 126, time analysis means 125 and fitting means 123. Time-analysis means 125 determines a time $t_0$ at which the gamma-ray first interacted with detector 100.

Figure 7:
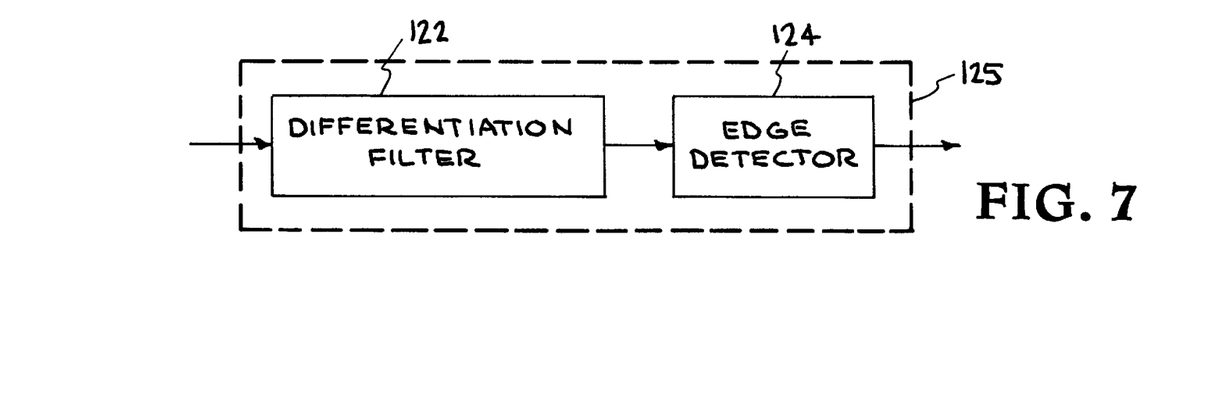
FIG. 7 is a block diagram showing the ordering of the components in the preferred embodiment of the timing analysis means of FIG. 6.

The preferred components of the time-analysis means 125 are shown in FIG. 7: a differentiation filter 122 and an edge detector 124. The differentiation filter 122 converts its input signal into an approximation of the derivative of the signal which appeared at detector 100. Note that due to the bandwidth limitations of the detector preamplifier 112, there will be a frequency $F_{max}$ above which no information is accurately available about the detector signal. The preferred embodiment of the differentiation filter 122 is as an IIR (infinite impulse response) digital filter [See Stearns, Samuel D. and David, Ruth A., Signal Processing Algorithms, Prentice-Hall, Englewood Cliffs, N.J., 1988, INBN 0-13-809435-7, p. 103]. To understand how to design the appropriate differentiation filter 122 it is easiest to think of it as consisting of three parts. The three parts are: (1) a deconvolution filter, which reverses the distorting effect of the preamplifier 112, the amplifier 114 and the digital recorder 116; (2) a low pass filter which greatly attenuates frequencies above $F_{max}$; and (3) a differentiator.

The frequency responses of the three parts of the differentiation filter 122 are determined before designing the filter. Although the frequency response is a complex quantity, having both an amplitude and a phase, ignoring the phase and designing a filter only to match the amplitude produces acceptable results. The frequency response of the differentiator is $2\pi f$. One can use $\exp(-f^2/F_{max}^2)$ for the frequency response of the low pass filter. The frequency response of the deconvolution filter is the reciprocal of the frequency response of the system consisting of the preamplifier 112, the amplifier 114 and the digital recorder 116. This frequency response can be determined by placing a step signal into the detector 100 (through a test input), recording the resulting signal on the digital recorder and using the techniques described in IEEE Standard 1057 to calculate the frequency response.

The frequency response of the differentiation filter 122 is obtained by multiplying together the frequency responses of the three parts. Software for designing filters for a specified frequency response amplitude is readily available [MATLAB Signal Processing Toolbox Version 4, command "yulewalk"].

The output of differentiation filter 122 is fed into edge detector 124. The function of the edge detector is to determine at what time in the charge detection time $T_c$ of the detector 100 the photon causing the charge signal first interacted with the detector. In the preferred embodiment, edge detector 124 comprises a low pass filter followed by a means to calculate and output ARC (Amplitude and Rise time Compensated) timing based on the output of the low pass filter. The low pass filter is to decrease the effects of noise on the accuracy of the ARC timing. As the bandwidth of the low pass filter is decreased, the time errors due to noise decrease, but when the bandwidth becomes too low, the systematic error due to decreasing the rise time of the signal becomes larger than the error due to the noise. An optimum bandwidth is easily determined empirically or with simulations.

The algorithm used by the ARC calculation means to determine the start time of the signal to preferably operates as follows: where the signal produced by the low pass filter over time is described by function p(t), a threshold level $p_0$ is chosen where $p_0$ is just above the peak noise level. A crossing time $t_c$ is then chosen which satisfies the following formulae: $p(t_c) \geq p_0$, and $p(t_c)=0.5\ p(t_c+20\ ns)$. Once $t_c$ is determined, $t_0=t_c-t_{off}$, where $t_{off}$ is a predetermined offset timing value which may be calculated empirically through calibration tests. Edge detector 124 should output this calculated to value.

There is an alternate method of accomplishing the time analysis that does not involve differentiating the signal. With this method one calculates the time, $t_{10}$, at which the signal reaches 10% of its final amplitude and the time, $t_{20}$, at which the signal reaches 20% of its final amplitude and then estimates the starting, $t_0$, of the signal by the formula $t_0=t_{10}-(t_{20}-t_{10})$. This approach can work better in high noise situations.

Referring to FIG. 6, in the preferred embodiment, the output of the digitizing means 110 is fed into the noise whitening filter 126, shown in FIG. 6, simultaneously as it is fed into differentiation filter 122 of the time-analysis means 125. Noise whitening filter 126 is preferably included because the fitting means 123 is optimized for white signal noise. Noise whitening filter 126 may be any filter which transforms the noise of the signal it receives into approximately white noise. The amplitude of the frequency response of the noise whitening filter 126 is the reciprocal of the square root of the noise power spectral density measured at the output of the digital recorder 116. The design of the noise whitening filter 126 can be carried out by the same means as already described for the design of the differentiation filter 122.

Referring to FIG. 6, the fitting means 123 receives the digitized signal output by digital recorder 116, preferably after it has passed through noise whitening filter 126. Fitting means 123 preferably also receives as an input the start time $t_0$ calculated by time-analysis means 125. From these inputs, fitting means 123 calculates the radial coordinates of the gamma-ray energy deposition(s) in the detector 100 by analyzing the measured digital signal as follows.

The preferred method of analysis of the digital signal utilizes a function termed the pulse response function which must be calculated for the inventive system. The pulse response function, K(t,r), is the signal generated by a single gamma ray interaction with the detector occurring at time=0, at radial coordinate, r, and with energy of unity, i.e., $$v(t)=EK(t,r) \qquad (2)$$

where v(t) is the observed signal and E is the energy deposited by the gamma-ray. The pulse response function values will depend both on the detector and on the electronics used between the detector and where the signal is measured. K(t,r) satisfies the equation $$K(t, r) = \int_0^t K_0(t', r)h(t - t')dt' \qquad (3)$$

where $K_0(t',r)$ is the pulse response function at the detector and h(t) is the impulse response of the system between the detector and the point of signal measurement.

Accordingly, K(t,r) is estimated by obtaining estimates for both $K_0(t,r)$ and h(t). The value of h(t) can be measured by applying a step signal to a test point on the detector, recording the resulting signal on a digital oscilloscope, and numerically differentiating the result. Because the impulse response is the derivative of the step response, the differentiated result of the step signal measurement will be h(t).

$K_0(t,r)$ is estimated using an iterative procedure which involves both the use of measured values and theoretical calculations. Because the value of $K_0(t,r)$ is determined partially from collected data, $K_0(t,r)$ will not be determined for all r. Rather, $K_0(t,r)$ need only be calculated for as many r values as are required by the computational means 121 and/or the rejection analyzer 160 (shown in FIG. 8) to perform their functions. A preferred such collection of r values is to calculate r for each $r_i$ where $r_i=R_I+(i-\frac{1}{2})(R_O-R_I)/N$ for i=1 N, $R_I$ is the inner radius of the detector, $R_O$ is the outer radius of the detector, and N is the number of virtual zones used by the computational means so that the radial deposition of energy in the detector can be identified for a particular zone. These "virtual zones" are essentially zones defined in parallel to the detector's electrodes and thus demarcate regions corresponding to particular radial coordinates.

In the preferred method of calculating $K_0(t,r)$, it is assumed that charge carriers in the semiconductor detector have constant electron velocity $v_e$ and constant hole velocity $v_h$. While this may not be entirely accurate, this model gives an adequate approximation for many detectors. The shape and bias voltage of detector 100 is preferably chosen to have relatively constant electron and hole velocities.

A theoretical model for $K_0(t,r)$ which assumes constant electron and hole velocities is described in Glenn F. Knoll, *Radiation Detection and Measurement*, 2nd edition, pages 401–07, which is herein incorporated by reference, referring specifically to the model described by equation 12–27, page 406. In this application, this theoretical model will be termed $J_0(t,r,v_e,v_h)$. The derivative with respect to time of $J_0(t,r,v_e,v_h)$ will display instantaneous jumps, and the locations of these jumps are dependent upon the values $v_e$ and $v_h$. $v_e$ and $v_h$ and can be determined with reasonable accuracy by measuring the time separation between the jumps in $J_0(t,r,v_e,v_h)$ for two different values of r.

This is preferably accomplished according to the following procedure. A signal is generated in the detector 100 by a beam of gamma radiation which has been collimated so that it parallels the Z axis of the detector and strikes the detector at a known value of r. The measured signal may be termed P(t,r). When a photon from the beam has only one interaction with the detector, P(t,r) will be proportional to K(t,r). Thus, the energy of the gamma-ray photons in the beam should be sufficiently high that there is a significant probability that they will have only one interaction with the detector. For example, where a Cs-137 source is used for the radiation, and the measured signals are only kept if they represent an energy level between 400 and 450 kev, then for a detector 5 cm in length, about 10% of the kept signals will represent single interactions with the detector. This is a sufficiently significant probability.

To identify a particular measurement $P_i(t,r)$ which represents a single interaction with the detector, many measurements $P_1(t,r) \ldots P_n(t,r)$ are made. For example, n=100 measurements should be sufficient in most cases. These measurements are tested against a modeled signal, and any measurement $P_i(t,r)$ is kept only if its value is sufficiently close to the modeled signal. The model, $K_m(t,r,v_e,v_h)$, is described according to the following formula:

$$K_m(t, r, v_e, v_h) = \int_0^T J_0(t', r, v_e, v_h) h(t - t') dt'. \quad (4)$$

Using rough estimates of $v_e$ and $v_h$ and the measured impulse response h(t), the modeled value $K_m$ can be determined for any t and r. Then, for a given measurement $P_i(t,r)$, $P_i(t,r)$ is kept as a single interaction measurement only if $$\int_0^T |P_i(t, r) - a_i K_m(t - \tau_i, r, v_e, v_h)|^2 dt \leq \alpha, \quad (5)$$

where the parameters α and τ are chosen, independently for each i, to minimize the integral, and the value of α is chosen to select somewhat fewer than the expected number of single interaction pulses.

The value of n in the above procedure must be large enough so that at least one signal representing a single interaction with the detector has been chosen for each r value. Each of these signals has h(t) deconvolved from it, and the deconvolved signals are then numerically differentiated. As can be seen from equation (4), these deconvolved, differentiated signals measure the time derivative of $J_0(t',r,v_e,v_h)$, and thus represent estimates of the time derivative of $K_0(t,r)$. The deconvolved, differentiated signals will have an initial rapid transition followed by two other rapid transitions which represent the arrival of the electrons and the holes at their respective conductors. The times between these transitions can be used to obtain more accurate estimates of the electron and hole velocities $v_e'$ and $v_h'$.

Using the more refined particle velocity estimates $v_e'$ and $v_h'$, the signal selection process (4) is performed again, using the same signal data, but using tighter tolerances, thus selecting even more accurate values of P(t,r), representing more accurate measurements of $K_0(t,r)$. Thus, signals are only kept which satisfy $$\int_0^T |P_i(t, r) - a_i K_m(t - \tau_i, r, v_e', v_h')|^2 dt \leq \alpha', \quad (6)$$

where α'<α.

Using the signals $P_i(t,r)$ selected in (6), we may estimate the PRF, K(t,r), by $$K(t, r) = \frac{1}{N} \sum_{i=1}^{N} \frac{1}{a_i} P_i(t + \tau_i, r), \quad (7)$$

where $a_i$ and $\tau_i$ are the constants determined in (6) and $N_p$ is the number of selected pulses.

For high-purity germanium detectors in which the electric field is sufficiently high that the charge carrier velocities are saturated, we determined values for the constant electron and hole velocities by the method described above. In this case the theoretical PRF, $K_m(t,r,v_e',v_h')$, is a very close approximation to the empirical PRF, K(t,r), when one uses the velocities of 0.095 meters/microsecond for elections and 0.075 meters/microsecond for holes. However, for other semiconductor materials and for detectors in which the electric field is not adequately high, the full procedure described above should be utilized to calculate the PRF.

Using the PRF K(t,r) estimates for each $r_i$, the fitting means 123 determines how much energy from each photon was deposited in each of the N virtual zones of the detector. To do so, in the preferred method of calculation, the fitting means 123 uses the equation $$u(t) = v(t) - \sum_{i=1}^{N} e_i K(t, r_i'), \quad (8)$$

where v(t) is the measured signal, $r_i'$ is the radial coordinate of the detector at the center of the $i^{th}$ zone, and $K(t,r_i')$ is the pulse response function of the inventive system at the point of input to the computational means. The fitting means then chooses parameters $e_i$ to minimize u(t) in the least squares sense, where the values of $e_i$ are constrained to be positive. This is a standard constrained linear least squares problem for which many methods of solution are known. These values $e_i$ are used as a reasonably good estimate of the amount of energy deposited in the ith virtual zone of the inventive system. It should be noted that if the gamma-ray deposits its energy anywhere but at the center of the zone, a fraction of the energy, proportional to the distance to the farthest adjacent zone, will appear in the nearest adjacent zone. If the energy deposition occurs at the boundary between two zones, half of the energy will appear in each zone. The means for taking this into account is described later.

When the preferred computational means 120 uses the above formula for u(t), the use of a time analysis means to calculate $t_0$ is required, because u(t) must be calculated in terms of a time t fixed in reference to $t_0$. However, in a second (altenatuve) embodiment, a different formula for u(t) is used which does not require the use of a time analysis means to calculate $t_0$. If, instead, the formula $$u(t) = v(t) - \sum_{i=1}^{N} e_i K(t - t_0, r_i') \quad (9)$$

is used, the equation may be solved as a non-linear least squares problem (formula (8) is a linear least squares problem) for which both values of $e_i$ and $t_0$ are found that minimize u(t). This embeds the finding of $t_0$ into the least squares problem, making the time analysis means 125 unnecessary; it also produces more accurate results for the $e_i$ values. However, this formula also takes much longer to calculate than does the first formula, and thus cannot presently be done at the particularly rapid rate allowed by formula (8).

The computational means 121 outputs the $e_i$ values as the calculations of radial energy deposition by the gamma-lay measured by the inventive system. Normally, the values will be output to other equipment which will use the data in other algorithms, depending on the application. The computational means 120 could, however, output these values to a display mechanism for human perusal. The inventive system may conclude with the output step.

Figure 8:
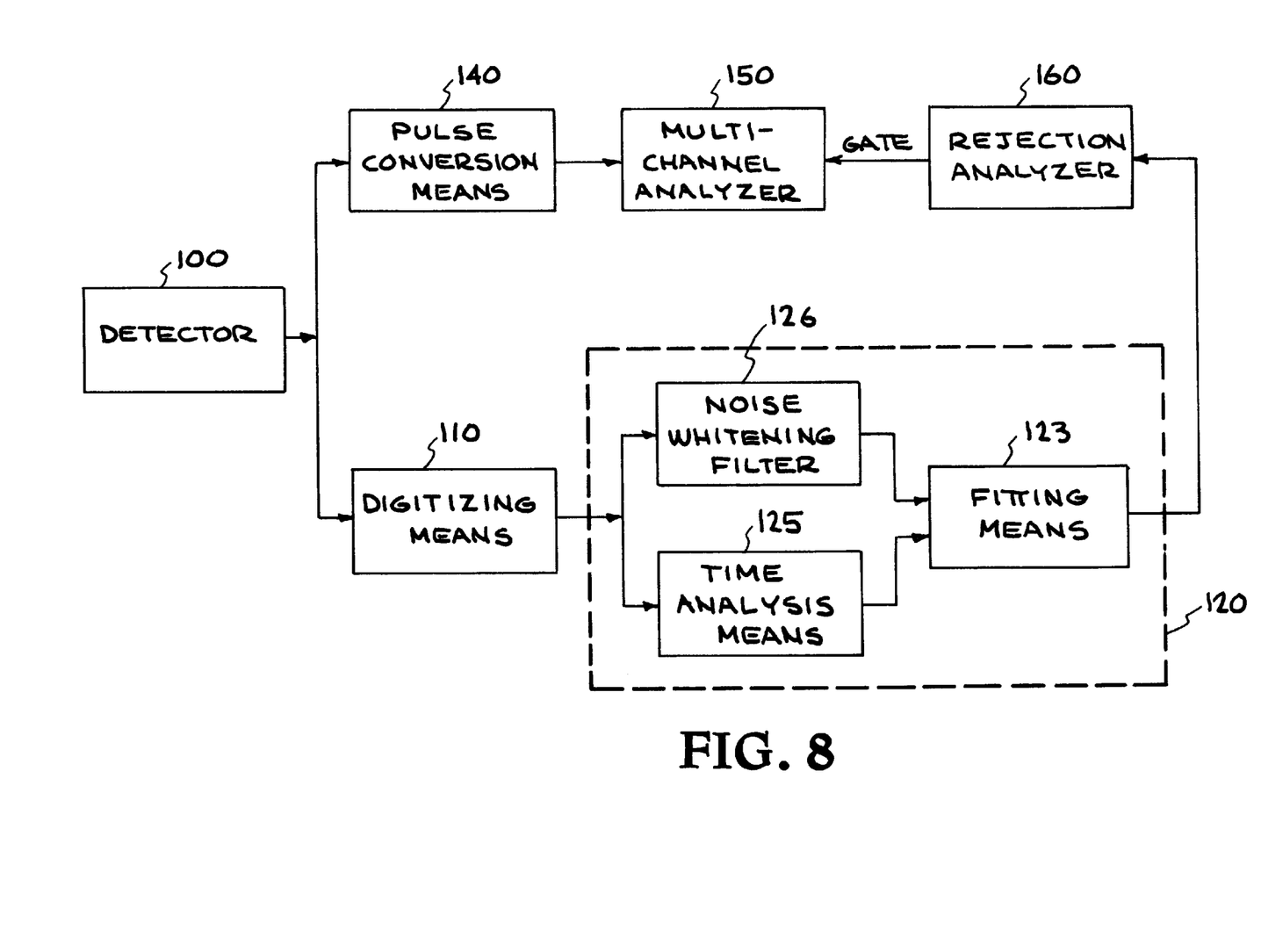
FIG. 8 is a block diagram showing the ordering of the components used in a preferred embodiment of the inventive system which also performs Compton suppression.

However, in a preferred embodiment, further components are added to the inventive system which perform Compton suppression to improve the peak-to-total ratio. This portion of the invention is used in conjunction with conventional means to record the energy spectrum of gamma rays striking the detector. Referring to FIG. 8, the most common such conventional means comprises a pulse conversion means 140 and a multi-channel analyzer 150.

Pulse conversion means 140 converts the output of the detector 100 into a digital number proportional to the amount of charge built up in the detector. The pulse conversion means typically comprises a pre-amplifier followed by an amplifier, a pulse shaper and an analog to digital converter (ADC) (all not shown). The pre-amplifier used in the pulse conversion means is preferably the same pre-amplifier 112 used in digitizing means 110.

The number produced by the pulse shaping means is fed into multichannel analyzer 150. Multichannel analyzer 150 does not store the value from the pulse shaping unless it receives a STORE signal which indicates that a full energy event has been detected by a rejection analyzer 160, as described below.

It should be noted that there are other approaches that can be used to accomplish the same ends as those accomplished by the pulse conversion means 140 and the multi-channel analyzer 150. One approach is to simulate the multi-channel analyzer 150 in software, preferably on the same computer that is performing the radial energy distribution calculations. Additional improvement can be made by removing the pulse conversion means 140 and performing the same function using data from digitizing means 110 and digital signal processing on the data obtained therefrom.

When rejection analyzer 160 is included in the inventive system, fitting means 123 additionally calculates a second set of radial energy depositions $e_j'$ according to the same process as described earlier for, using the equation $$u(t) = v(t) - \sum_{j=1}^{N-1} e_j' K(t, r_j'), \quad (10)$$

where $r_j'$ values correspond to the radial coordinates of the detector at the boundaries, such that for j=1, $r_j'$ is the radial coordinate of the upper boundary of virtual zone 1, and so forth. Positive $e_j$ values are chosen to minimize u(t) according to the least squares process. These $e_j'$ values basically give good estimates of the distribution of energy in the virtual zones shifted over one half virtual zone from the virtual zones defined for the $e_i$ values. The $e_j'$ values allow the algorithm used by the rejection analyzer 160 to correctly identify the energy deposition where the gamma-ray deposited its energy near the boundary between two of the zones measured by $e_i$, because the $e_j'$ zones, being shifted over one half virtual zone, will not show half of the energy deposited in each of two zones. Note that the computational means 120 can additionally output these $e_j'$ values to equipment other than rejection analyzer 160 to provide further information about the radial distribution of energy deposited by the gamma-ray.

Rejection analyzer 160 receives as input from fitting means 123 the values $e_i$ and $e_j'$ and uses them to determine whether the pulse they represent should be counted by the multi-channel analyzer 150. If the rejection analyzer 161 determines that the pulse represents a Compton escape event, the rejection analyzer outputs a signal having a NOT-STORE value. This output of rejection analyzer 160 is fed into multichannel analyzer 150. Multi-channel analyzer 150 should only store the shaped pulse when the output from rejection analyzer 160 has a STORE value.

Possible embodiments of the output of rejection analyzer 160 include a gated signal, such that a signal is allowed to pass through the gate only when the data indicates that the pulse represents a full energy event, or a Boolean signal with a STORE value when the pulse represents a full energy event and a NOT-STORE value when the pulse represents a Compton escape event.

To determine whether a Compton escape event has occurred, the rejection analyzer 160 must determine whether the observed signal resulted from a gamma-ray with the same energy as that implied by the analyzed characteristics of the signal, indicating a full energy event, or a gamma-ray with higher energy than that implied by the analyzed characteristics of the signal, indicating a Compton escape event. The preferred method used by the rejection analyzer 160 uses the principle that in full energy events, gamma-rays having energies of greater than 100 kev usually involve three or more interactions between the gamma-ray and the detector 100. In contrast, escape events typically have fewer interactions with the detector 100 and concentrate their energy deposition into one or two locations. With only one or two locations, at least half of the energy deposited by the escaping gamma-ray will be deposited in one virtual zone. The algorithm used by rejection analyzer 160 is designed to identify signals for which such large percentages of the energy deposited in the signal are located at one virtual zone.

The rejection analyzer 160 finds that a pulse represents a Compton escape event when $E^* \geq f(E_{Tot}) \cdot E_{Tot}$, where $E_{Tot}$ is the total energy deposited in the detector 100 by the gamma-ray producing the pulse, $E^*$ is the largest energy deposited in a single zone, and $f(E_{Tot})$ is a fraction which can be determined by Monte Carlo simulations to give the best results (i.e. a sufficient portion of the total energy deposited in the detector by one gamma-ray interaction is located in one virtual zone to indicate that a Compton scattering event has occurred). We have found that letting $f(E_{Tot})$ be the largest possible fraction of energy that can be transferred in one Compton scattering interaction works quite well. E* is determined using the input values $e_i$ and $e'_j$ as follows. Let k1 be the value of i for which $e_i$ is maximum. If $e'_{k1+1} \geq e'_{k1-1}$, let k2=k1+1, k3=k1-1, k4=K1-1, and k5=k1+1. Otherwise, let k2=k1-1, k3=k1+1, k4=k1+1, and K5=K1-1. Then, the estimate for E* will be given by $$E^* = a_1 e_{j1} + a_2 e'_{j2} + a_3 e'_{j3} + a_4 e_{j4} + a_5 e_{j5}. \quad (11)$$

where the parameters $a_1$, $a_2$, $a_3$, $a_4$, and $a_5$ are constants that are determined by least squares from Monte Carlo simulations as follows.

For each photon in the Monte Carlo simulation determine E*, $e_{k1}$, $e'_{k2}$, $e'_{k3}$, $e_{k4}$ and $e_{k5}$. Then determine the constants, $a_1$ through $a_5$, for which the right hand side of equation (11) gives the best least squares fit (summed over all photons in the simulation) to the left hand side. The results will depend on the energy distribution of the photons in the simulation, which should represent the distribution for which the algorithm is intended to be used.

There are situations for which the calculations in equation (11) can not he carried out, and these have to be handled differently. If the zone of maximum energy deposition is either the first or the last zone, then two of the indices in equation (11) can refer to non-existent zones. In these two cases, the two non-existent zones in equation (11) must he eliminated. The coefficients to use in these special cases are determined in the same manner as for the more general case already described.

The method for calculating E* given in the preceding paragraphs works very well, but is quite involved. We have found that in many cases the much simpler approach of letting E* be the maximum value of $e_k + e_{K+1}$ works perfectly well.

Although the foregoing invention has been described in some detail by way of illustration for purposes of clarity of understanding, it will be readily apparent to those of ordinary skill in the art in light of the teachings of this invention that certain changes and modifications may be made thereto without departing from the spirit or scope of the appended claims.

What is claimed is:

1. Apparatus for measuring gamma-ray energy deposition for use in conjunction with a semiconductor detector, said detector comprising two electrodes and a detecting material, said detector producing a charge signal E(t) when an incident gamma-ray interacts with said detector, comprising:
   digitizing means for converting said charge signal E(t) into a digitized charge signal;
   a computational means for receiving said digitized charge signal, and for calculating in which of a plurality of zones said gamma-ray deposited energy in said detector;
   said computational means further comprising a fitting means for using said digitized charge signal to determine a radial distribution of an amount of energy deposited by said gamma-ray in said plurality of zones; and
   said computational means further comprising a time analysis means for receiving said digitized charge signal from said digitizing means, for calculating a start time $t_0$ at which said gamma-ray first interacted with said detector, and for outputting said start time $t_0$ to said fitting means.

2. The apparatus of claim 1, wherein said time-analysis means comprises a differentiation filter for receiving said digitized charge signal coupled to an edge detector.

3. The apparatus of claim 1, wherein said time-analysis means determines first and second times at which said digitized charge signal respectively attains first and second predetermined fractions of a final value of said digitized charge signal, and uses said first and second times to calculate said start time $t_0$.

4. Apparatus for measuring gamma-ray energy deposition for use in conjunction with a semiconductor detector, said detector comprising two electrodes and a detecting material, said detector producing a charge signal E(t) when an incident gamma-ray interacts with said detector, said charge signal having an amplitude corresponding to an amount of energy deposited in said detector by said gamma-ray comprising:
   digitizing means for converting said charge signal E(t) into a digitized charge signal;
   a computational means for receiving said digitized charge signal, for calculating in which of a plurality of zones said gamma-ray deposited energy in said detector, and for having an output indicating an amount of energy deposited by said gamma-ray in each of said zones;
   a pulse conversion means for receiving said charge signal E(t) from said detector and for converting said charge signal E(t) into an amplitude number that is proportional to said amplitude of said charge signal E(t);
   a multi-channel analyzer for defining a plurality of channels corresponding to successive values of said amplitude number, with each of said channels being capable of storing a count, and for receiving said amplitude number from said pulse conversion means; and
   a rejection analyzer for analyzing the output of said computational means, for determining whether the output of said computational means indicates a Compton escape event or a full energy event, and for generating a rejection analyzer output signal for being received by said multi-channel analyzer which has a STORE value when a radial energy histogram indicates a full energy event; wherein
   said multi-channel analyzer increments said count in said channel corresponding to said amplitude number only when said rejection analyzer output signal has said STORE value.

5. The apparatus of claim 4, wherein:
   said incident gamma-ray interacts a number of times with said detector; and
   said rejection analyzer estimates said number of interactions of each gamma-ray and generates a STORE signal when said number of interactions is greater than a predetermined value.

6. The apparatus of claim 4, wherein said rejection analyzer estimates a maximum single interaction energy deposited in said detector from a single interaction with a gamma-ray, and generates a NOT-STORE signal if said maximum single interaction energy is greater than a predetermined fraction of a sum of said indicated amounts of energy deposited in each of said zones.

7. The apparatus of claim 6, wherein said predetermined fraction represents a maximum amount of energy that a gamma-ray having energy equal to the total energy deposited can impart to an electron with a single collision.

8. The apparatus of claim 6, wherein said maximum energy deposited in a single interaction is estimated by combining the results of two different fitting operations in which the respective zones used for said two fitting operations are offset slightly from each other.

9. Apparatus for measuring gamma-ray energy deposition for use in conjunction with a semiconductor detector, said detector comprising two electrodes, a detecting material, and an electric field having electric field lines running through said detector material, said detector producing a charge signal E(t) that varies during a collection period occurring immediately after an incident gamma-ray interacts with said detector material, comprising:

means for measuring said charge signal E(t) at a plurality of times during said collection period;

digitizing means for converting said charge signal E(t) into a digitized charge signal; and a computational means for receiving said digitized charge signal, for calculating a coordinate colinear with one of said electric field lines for locating said gamma-ray interaction, and for calculating an amount of energy deposited at said coordinate.

10. The measuring apparatus defined in claim 9 wherein said computational means is further comprised of a fitting means for using said digitized charge signal to determine a radial distribution of an amount of energy deposited by said gamma-ray in said plurality of zones.

11. The measuring apparatus defined in claim 10 wherein said computational means is further comprised of a time analysis means for receiving said digitized charge signal from said digitizing means, for calculating a start time $t_0$ at which said gamma-ray first interacted with said detector, and for outputting said start time $t_0$ to said fitting means.

12. The measuring apparatus defined in claim 11 wherein:

said time-analysis means comprises a differentiation filter for receiving said digitized charge signal; and said differentiation filter is coupled to an edge detector.

13. The measuring apparatus defined in claim 11 wherein said time-analysis means determines first and second times at which said digitized charge signal respectively attains first and second predetermined fractions of a final value of said digitized charge signal, and uses said first and second times to calculate said start time $t_0$.

* * * * *